United States Patent
Kusakawa

(10) Patent No.: US 8,552,669 B2
(45) Date of Patent: Oct. 8, 2013

(54) DUTY RATIO CONTROL DEVICE, ELECTRIC POWER TOOL AND RECORDING MEDIUM

(75) Inventor: Takuya Kusakawa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 97 days.

(21) Appl. No.: 13/267,460

(22) Filed: Oct. 6, 2011

(65) Prior Publication Data

US 2012/0091929 A1    Apr. 19, 2012

(30) Foreign Application Priority Data

Oct. 13, 2010    (JP) ................. 2010-230588

(51) Int. Cl.
*H02P 7/29* (2006.01)
*H02P 6/08* (2006.01)
*H02K 7/14* (2006.01)

(52) U.S. Cl.
USPC ........... 318/139; 388/811; 388/819; 388/842; 388/847; 388/859

(58) Field of Classification Search
USPC ................. 318/443, 437, 456, 599, 610–618, 318/59, 61–71, 135–137; 388/800–811, 388/819, 827–831, 842, 847–859
See application file for complete search history.

(56) References Cited

U.S. PATENT DOCUMENTS

| | | | | |
|---|---|---|---|---|
| 7,834,565 B2 * | 11/2010 | Armstrong | ................. | 318/254.1 |
| 8,179,069 B2 * | 5/2012 | Matsunaga et al. | ........... | 318/434 |
| 8,294,399 B2 * | 10/2012 | Suzuki et al. | ............ | 318/400.17 |
| 2001/0050540 A1 * | 12/2001 | Takayama et al. | ............ | 318/599 |
| 2003/0151380 A1 * | 8/2003 | Akiyama et al. | .............. | 318/376 |
| 2009/0051306 A1 * | 2/2009 | Matsunaga et al. | ........... | 318/434 |
| 2009/0121671 A1 * | 5/2009 | Uehama et al. | ................ | 318/809 |
| 2009/0295313 A1 * | 12/2009 | Suzuki et al. | ................. | 318/139 |
| 2010/0237809 A1 * | 9/2010 | Ogahara | .................. | 318/400.13 |
| 2010/0308764 A1 * | 12/2010 | Suzuki et al. | ................. | 318/494 |
| 2011/0275231 A1 * | 11/2011 | Nagano et al. | ................ | 439/271 |

FOREIGN PATENT DOCUMENTS

| | | |
|---|---|---|
| JP | A-01-138988 | 5/1989 |
| JP | A-07-039181 | 2/1995 |
| JP | A-10-248279 | 9/1998 |

OTHER PUBLICATIONS

Baiming Shao; Emadi, A.; , "A digital PWM control for switched reluctance motor drives," Vehicle Power and Propulsion Conference (VPPC), 2010 IEEE , vol. No. pp. 1-6, Sep. 1-3, 2010.*

* cited by examiner

*Primary Examiner* — Eduardo Colon Santana
*Assistant Examiner* — Said Bouziane
(74) *Attorney, Agent, or Firm* — Oliff & Berridge, PLC

(57) ABSTRACT

A duty ratio control device includes a duty ratio calculation unit and a parameter setting unit. The duty ratio calculation unit, when an acceleration manipulation is performed, calculates a control duty ratio per predetermined timing based on a value of at least one parameter so that a rotation speed of a motor mounted on an electric power tool reaches a target rotation speed corresponding to the acceleration manipulation. The control duty ratio is calculated to be larger as the value of the at least one parameter is larger. The parameter setting unit sets the value of the at least one parameter. The value of the at least one parameter set for a reacceleration manipulation is larger than the value of the at least one parameter set for an initial acceleration manipulation.

15 Claims, 12 Drawing Sheets

DUTY RATIO CONTROL DEVICE, ELECTRIC POWER TOOL AND RECORDING MEDIUM

CROSS-REFERENCE TO RELATED APPLICATIONS

This application claims the benefit of Japanese Patent Application No. 2010-230588 filed Oct. 13, 2010 in the Japan Patent Office, the disclosure of which is incorporated herein by reference.

BACKGROUND

The present invention relates to a technique for controlling a control duty ratio which determines a magnitude of voltage to be applied to a motor mounted on an electric power tool.

Upon accelerating a motor of which rotation is in a stopped state, it is desirable that the rotation speed of the motor is quickly increased.

In Unexamined Japanese Patent Application Publication No. 7-039181, upon accelerating a motor of which rotation is in a stopped state, a duty ratio of a voltage applied to the motor is set high if a target rotation speed of the motor is high, and the duty ratio is set low if the target rotation speed is low.

When the target rotation speed is high, the duty ratio is set higher than the duty ratio when the target rotation speed is low. Thus, the rotation speed of the motor quickly goes up to rapidly reach the target rotation speed. On the other hand, when the target rotation speed is low, the duty ratio is set low. Thereby the rotation speed can reach the target rotation speed, while avoiding overshooting the target rotation speed.

As above, motor control that, upon accelerating the motor of which rotation is in a stopped state, increases the rotation speed of the motor by adjusting the duty ratio of the voltage applied to the motor can be applied to an electric power tool having a motor as a drive source.

SUMMARY

In an electric power tool, in addition to an initial acceleration manipulation for accelerating a motor in a stopped state, a reacceleration manipulation is sometimes executed in which a user performs a stopping manipulation to stop the motor during its rotation and then reaccelerate the motor in a decelerated state before the motor is in the stopped state.

The motor is being rotated without stopping when the reacceleration manipulation is started. Thus, in a reacceleration operation executed by the reacceleration manipulation, if a voltage applied to the motor is controlled at the same duty ratio as the duty ratio in an initial acceleration operation which accelerates the motor in a stopped state, the rotation speed of the motor cannot be rapidly increased.

In one aspect of the present invention, it is desirable that the rotation speed of the motor can be rapidly increased when the motor is reaccelerated during deceleration after the stopping manipulation.

A duty ratio control device according to first aspect of the present invention controls a control duty ratio that determines a magnitude of voltage to be applied to a motor mounted on an electric power tool. The duty ratio control device includes a duty ratio calculation unit and a parameter setting unit. The duty ratio calculation unit, when an acceleration manipulation for accelerating a rotation speed of the motor is performed, calculates the control duty ratio per predetermined timing based on a value of at least one parameter so that the rotation speed of the motor reaches a target rotation speed corresponding to the acceleration manipulation. The control duty ratio is calculated to be larger, as the value of the at least one parameter is larger. The parameter setting unit sets the value of the at least one parameter. The value of the at least one parameter set for a reacceleration manipulation is larger than the value of the at least one parameter set for an initial acceleration manipulation. The reacceleration manipulation is the acceleration manipulation performed again during a deceleration period in which the motor is being decelerated by a stopping manipulation that stops rotation of the motor. The initial acceleration manipulation is the acceleration manipulation performed when the rotation of the motor is being stopped.

In the duty ratio control device configured as such, the value of the at least one parameter set for the reacceleration manipulation is larger than the value of the at least one parameter set for the initial acceleration manipulation. Thus, the control duty ratio for the reacceleration manipulation is larger than the control duty ratio for a case in which the same value as the value of the at least one parameter for the initial acceleration manipulation is set in the reacceleration manipulation. Thereby, the rotation speed of the motor can be rapidly increased corresponding to the reacceleration manipulation.

The rotation speed of the motor can mean a rotation angle of the motor per unit time, or rotation frequency of the motor per unit time.

An electric power tool according to a second aspect of the present invention includes a motor, a manipulation unit, a duty ratio calculation unit, a parameter setting unit, and a drive unit. The motor receives electric power to rotate. The manipulation unit is provided for a user of the electric power tool to perform an acceleration manipulation for increasing a rotation speed of the motor and a stopping manipulation for stopping rotation of the motor. The duty ratio calculation unit, when the acceleration manipulation is performed, calculates a control duty ratio which determines a magnitude of voltage to be applied to the motor per predetermined timing, based on a value of at least one parameter, so that rotation speed of the motor reaches a target rotation speed corresponding to the acceleration manipulation. The control duty ratio is calculated to be larger, as the value of the at least one parameter is larger. The parameter setting unit sets the value of the at least one parameter. The value of the at least one parameter set for a reacceleration manipulation is larger than the value of the at least one parameter set for an initial acceleration manipulation. The reacceleration manipulation is the acceleration manipulation performed again during a deceleration period in which the motor is being decelerated by the stopping manipulation. The initial acceleration manipulation is the acceleration manipulation performed when the rotation of the motor is being stopped. The drive unit applies to the motor the voltage determined by the control duty ratio calculated by the duty ratio calculation unit to rotationally drive the motor.

In the electric power tool as configured as above, as in the case with the duty ratio control device according to the first aspect, the value of the at least one parameter set for the reacceleration manipulation is larger than the value of the at least one parameter set for the initial acceleration manipulation. Thus, the control duty ratio for the reacceleration manipulation is larger than the control duty ratio for a case in which the same value as the value of the at least one parameter for the initial acceleration manipulation is set in the reacceleration manipulation. Thereby, the rotation speed of the motor can be quickly increased corresponding to the reacceleration manipulation.

The electric power tool may include a battery pack that supplies electric power to the motor.

In this case, the parameter setting unit may set the value of the at least one parameter set for the reacceleration manipulation larger than the value of the at least one parameter set for the initial acceleration manipulation, based on at least one of the rotation speed of the motor upon starting the reacceleration manipulation, a motor current flowing to the motor in the reacceleration manipulation, an angle acceleration of the motor during the deceleration period before the reacceleration manipulation is started, an amount of reduction in the rotation speed of the motor during at least part of the deceleration period before the reacceleration manipulation is started, and a remaining amount of power in the battery pack.

For example, the parameter setting unit may set the value of the at least one parameter set for the reacceleration manipulation larger, as the rotation speed of the motor when the reacceleration manipulation is started is faster.

The faster the rotation speed of the motor is, the larger the rotation energy of the motor is. Thus, even if the control duty ratio is set higher as the rotation speed of the motor when the reacceleration manipulation is started is faster, reaction received by the electric power tool from the motor can be suppressed.

Accordingly, as the rotation speed of the motor when the reacceleration manipulation is started is faster, the value of the at least one parameter set for the reacceleration manipulation is set larger. Thereby, the rotation speed of the motor can be rapidly increased while the reaction received by the electric power tool from the motor is suppressed.

For example, the parameter setting unit may set the value of the at least one parameter set for the reacceleration manipulation larger, as the motor current flowing to the motor in the reacceleration manipulation is larger.

In the reacceleration manipulation, the larger the motor current flowing to the motor is, the larger the load received by the motor is. As the load received by the motor is larger, the reaction received by the electric power tool from the motor can be suppressed even if the control duty ratio is set high.

Accordingly, as the motor current flowing to the motor is larger in the reacceleration manipulation, the value of the at least one parameter set for the reacceleration manipulation is set larger. Thereby, the rotation speed of the motor can be rapidly increased while the reaction received by the electric power tool from the motor is suppressed.

For example, the parameter setting unit may set the value of the at least one parameter set for the reacceleration manipulation larger, as an absolute value of the angle acceleration of the motor during the deceleration period before the reacceleration manipulation is started is larger.

The larger the absolute value of the angle acceleration of the motor during the deceleration period is, the larger the load received by the motor is. The reaction received by the electric power tool from the motor can be suppressed even if the control duty ratio is set higher as the load received by the motor is larger.

Accordingly, as the absolute value of the angle acceleration of the motor during the deceleration period is larger, the value of the at least one parameter set for the reacceleration manipulation is set larger. Thereby, the rotation speed of the motor can be rapidly increased while the reaction received by the electric power tool from the motor is suppressed.

For example, the parameter setting unit may set the value of the at least one parameter set for the reacceleration manipulation larger, as the amount of reduction in the rotation speed of the motor during at least part of the deceleration period before the reacceleration manipulation is started is larger.

The larger the amount of reduction in the rotation speed of the motor is, the larger the load received by the motor is. The reaction received by the electric power tool from the motor can be suppressed even if the control duty ratio is set higher as the load received by the motor is larger.

Accordingly, as the amount of reduction in the rotation speed of the motor during the at least part of the deceleration period before the reacceleration manipulation is started is larger, the value of the at least one parameter set for the reacceleration manipulation is set larger. Thereby, the rotation speed of the motor can be rapidly increased while the reaction received by the electric power tool from the motor is suppressed.

For example, the parameter setting unit may set the value of the at least one parameter set for the reacceleration manipulation larger, as the remaining amount of power in the battery pack is smaller.

The smaller the remaining amount of power is in the battery pack, the lower an effective voltage applied to the motor is at the same control duty ratio.

Accordingly, as the remaining amount of power in the battery pack is smaller, the value of the at least one parameter set for the reacceleration manipulation is set larger. Thereby, reduction in the voltage applied to the motor can be inhibited and the rotation speed of the motor can be rapidly increased.

The control by the control duty ratio of the voltage applied to the motor may or may not include feedback control.

For example, if the control by the control duty ratio of the voltage applied to the motor does not include feedback control, the duty ratio calculation unit may calculate the control duty ratio by a linear expression using elapsed time from when each of the initial acceleration manipulation and the reacceleration manipulation is performed as a variable. In this case, the at least one parameter may include at least one of a coefficient and an intercept of the linear expression.

Thereby, the control duty ratio set for the reacceleration manipulation is larger than the control duty ratio for a case in which the same value as the value of the at least one parameter for the initial acceleration manipulation is set in the reacceleration manipulation. As a result, the rotation speed of the motor in the reacceleration manipulation can be increased more rapidly than the rotation speed of the motor for a case in which the same value as the value of the at least one parameter for the initial acceleration manipulation is set in the reacceleration manipulation.

In contrast, the control by the control duty ratio of the voltage applied to the motor includes feedback control, the duty ratio calculation unit may calculate the control duty ratio by a predetermined feedback control law based on a difference between the target rotation speed of the motor corresponding to one of the initial acceleration manipulation and the reacceleration manipulation and an actual rotation speed of the motor. In this case, the at least one parameter may include at least one feedback gain in the feedback control law.

Thereby, the control duty ratio calculated using the at least one feedback gain set in the reacceleration manipulation is larger in the reacceleration manipulation than the control duty ratio calculated using the at least one feedback gain set in the initial acceleration manipulation. As a result, the rotation speed of the motor can be rapidly increased to reach the target rotation speed in the reacceleration manipulation.

If the feedback control law includes at least a proportional term, the at least one parameter may include a proportional gain of the proportional term. If the feedback control law further includes an integral term, the at least one parameter may further include an integral gain of the integral term. In these cases, the rotation speed of the motor can be rapidly increased to reach the target rotation speed.

The parameter setting unit may set the value of the at least one parameter such that the angle acceleration of the motor in the reacceleration manipulation is equal to or smaller than a predetermined maximum angle acceleration of the motor in the initial acceleration manipulation.

Thereby, the reaction received by the electric power tool from the motor in the reacceleration manipulation can be equal to or smaller than the reaction received in the initial acceleration manipulation.

The above-described electric power tool may take any forms. For example, the above-described electric power tool may be a mower in which the reacceleration manipulation is frequently performed and prompt increase in the rotation speed of the motor in the reacceleration process is expected.

A program according to a third aspect of the present invention makes a computer mounted on an electric power tool including a motor execute a duty ratio calculation step and a parameter setting step. In the duty ratio calculation step, when an acceleration manipulation for increasing a rotation speed of the motor is performed, a control duty ratio which determines a magnitude of voltage applied to the motor is calculated per predetermined timing based on a value of at least one parameter so that the rotation speed of the motor reaches a target rotation speed corresponding to the acceleration manipulation. In the duty ratio calculation step, the control duty ratio is calculated to be larger, as the value of the at least one parameter is larger. In the parameter setting step, the value of the at least one parameter is set. In the parameter setting step, the value of the at least one parameter set for a reacceleration manipulation is larger than the value of the at least one parameter set for an initial acceleration manipulation. The reacceleration manipulation is the acceleration manipulation performed again during a deceleration period in which the motor is being decelerated by a stopping manipulation that stops rotation of the motor. The initial acceleration manipulation is the acceleration manipulation performed when the rotation of the motor is being stopped.

According to this program, the computer mounted on the electric power tool can function as the duty ratio control device according to the first aspect.

The aforementioned computer may be a known computer or a computer configured to be suitable for an electric power tool.

The aforementioned program may be stored in a ROM or a backup RAM incorporated in the computer, and may be used by being loaded to the computer from the ROM or the backup RAM or loaded to the computer via a network.

The aforementioned program may be recorded in a recording medium in various forms readable on the computer and be used. Examples of the recording medium include, for example, portable semiconductor memory (e.g., USB memory, memory cards, etc.), and so on.

BRIEF DESCRIPTION OF THE DRAWINGS

The present invention will now be described as an example with reference to the accompanying drawings, in which.

DETAILED DESCRIPTION OF THE PREFERRED EMBODIMENTS

[First Embodiment]
(Overall Structure of an Electric Power Tool)

Figure 1:
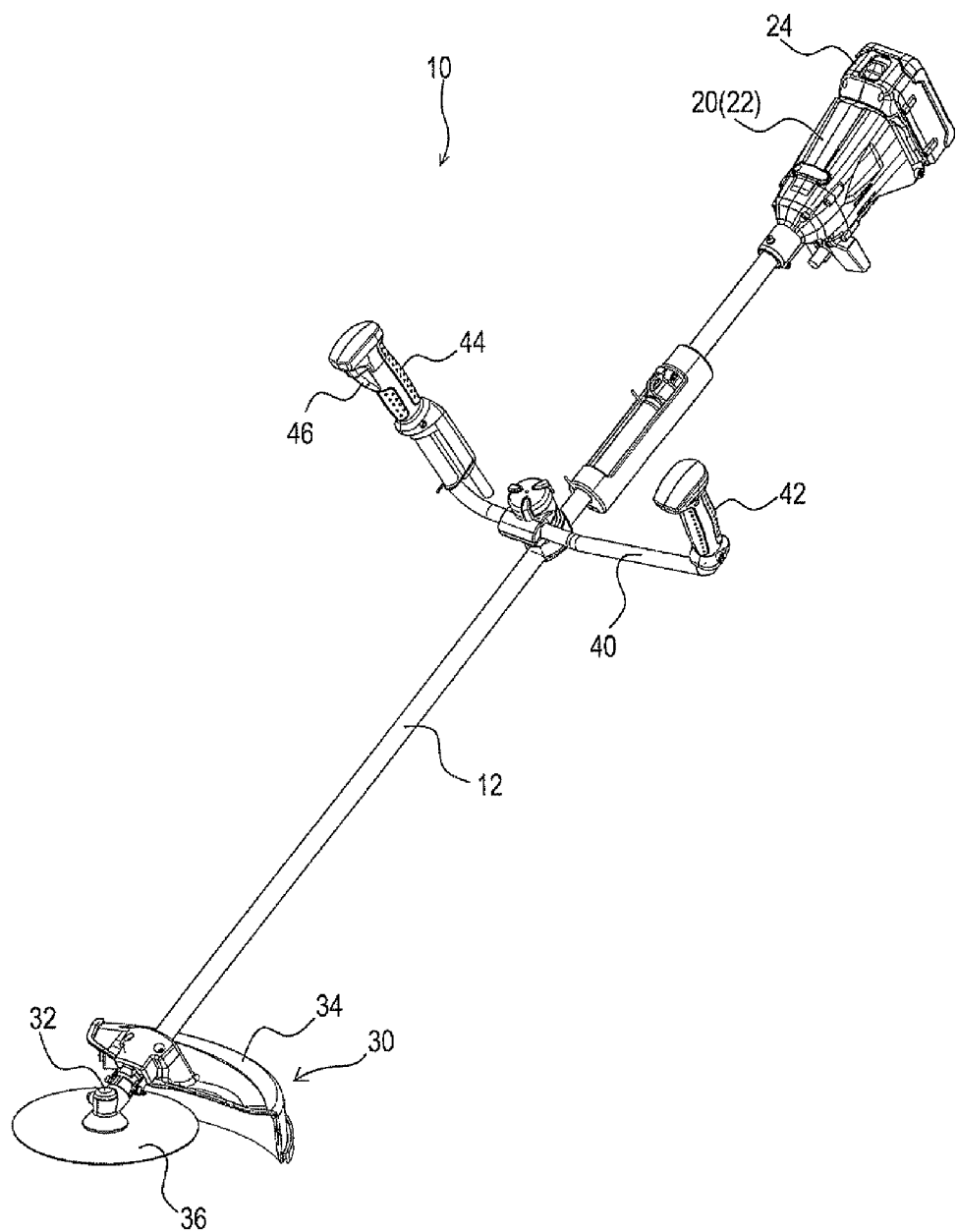
FIG. 1 is a perspective view showing an overall structure of an electric power tool according to a first embodiment.

An electric power tool 10 shown in FIG. 1 is configured as a so-called mower which mows grass and small trees. The electric power tool 10 includes a shaft pipe 12, a motor unit 20, a battery pack 24, a mowing blade unit 30, and a handle 40.

The shaft pipe 12 is formed into a hollow bar. The motor unit 20 is provided at one end of the shaft pipe 12. The mowing blade unit 30 is provided on the other end of the shaft pipe 12. The handle 40 is provided between the motor unit 20 and the mowing blade unit 30 of the shaft pipe 12.

The motor unit 20 houses a later-described mowing blade drive circuit (see FIG. 2) and others. The mowing blade drive circuit includes a motor 22.

The motor 22 rotationally drives a mowing blade 36 attached to the mowing blade unit 30 via a drive force transmission shaft housed in the shaft pipe 12.

The battery pack 24 houses a rechargeable battery (e.g., lithium ion rechargeable battery) which supplies electric power to the motor 22 in the motor unit 20. The battery pack 24 can be attached to and detached from the motor unit 20.

The mowing blade unit 30 includes a gear case 32 and a cover 34. The gear case 32 houses various gears that transmit a drive force of the motor 22 from the drive force transmission shaft housed in the shaft pipe 12 to the mowing blade 36.

The cover 34 covers a user side of the mowing blade 36 in order to inhibit the grass mowed by the mowing blade 36 from scattering to the user side of the electric power tool 10. The mowing blade 36 is formed into a disk shape and can be attached to and detached from the mowing blade unit 30. Instead of the plate-like mowing blade 36, a string-like mowing blade such as a nylon cord can be also attached to the mowing blade unit 30.

A handle 40 is formed into a U-shape. At the left side end of the handle 40 in the direction from the motor unit 20 toward the mowing blade unit 30, a left-hand grip 42 is provided. At the right side end, a right-hand grip 44 is provided. The left-hand grip 42 and the right-hand grip 44 are provided so that the user holds the electric power tool 10 by gripping the respective grips. A trigger switch 46 for the user to manipulate drive of the mowing blade 36 is provided in the right-hand grip 44.

In order to inhibit the mowing blade 36 from being driven by erroneous manipulation of the trigger switch 46 by the user of the electric power tool 10, a so-called lock off switch may be provided at the right-hand grip 44. The lock off switch prohibits drive of the mowing blade 36 regardless of the amount of manipulation of the trigger switch 46.

(Electric Configuration of the Electric Power Tool)

Figure 2:
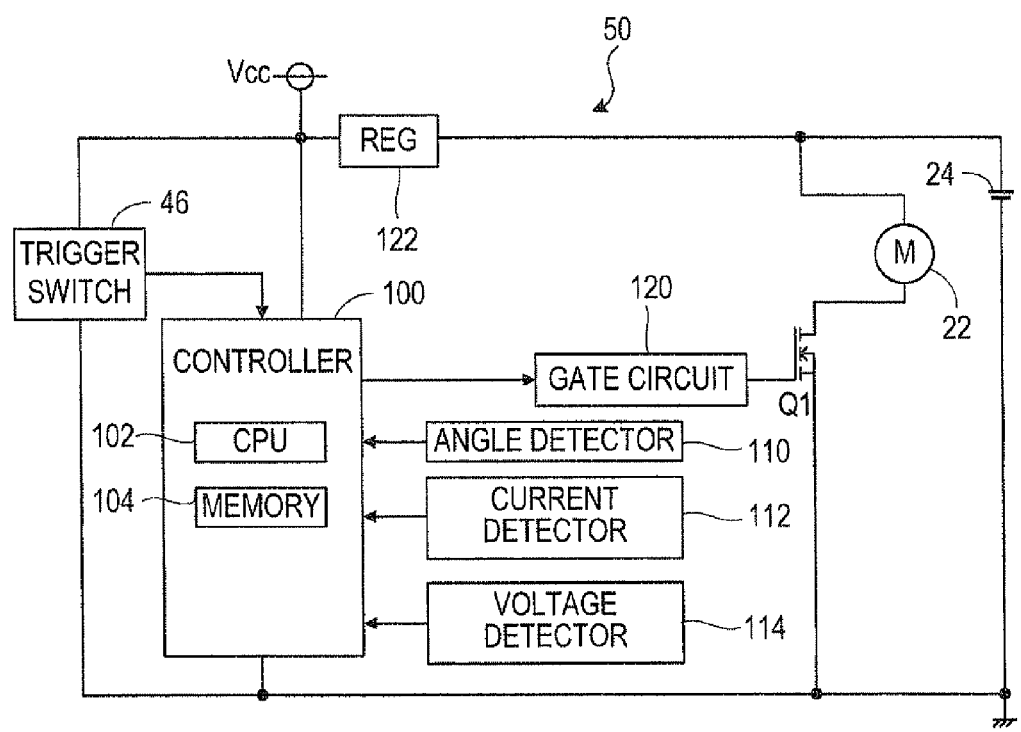
FIG. 2 is a circuit diagram of mowing blade driving circuit in the electric power tool.

As shown in FIG. 2, a mowing blade drive circuit 50 of the electric power tool 10 includes the aforementioned battery pack 24, the aforementioned motor 22, the aforementioned trigger switch 46, a switching element Q1, a controller 100, a gate circuit 120, an angle detector 110, a current detector 112, a voltage detector 114, and a constant voltage power circuit (Reg) 122.

The trigger switch 46 includes, for example, not shown contact switch and variable resistor. The trigger switch 46 is configured to output to the controller 100 a signal (manipulation signal) indicating whether or not the trigger switch 46 is pulled and a signal indicating a voltage value corresponding to an amount of manipulation (pulling amount) from the initial position of the trigger switch 46.

The motor 22 of the present embodiment is a brushed DC motor. One end of a coil of the motor 22 is connected to a positive terminal of the battery pack 24. The other end of the coil of the motor 22 is connected to a negative terminal of the battery pack 24 via the switching element Q1. Specifically, the switching element Q1 is provided on a current-carrying path from the battery pack 24 to the motor 22. When the switching element Q1 is turned off, conduction to the motor 22 is interrupted. When the switching element Q1 is turned on, conduction to the motor 22 is permitted. The switching element Q1 in the present embodiment is a N channel MOS-FET. A gate of the switching element Q1 is connected to the controller 100 via the gate circuit 120. A source of the switching element Q1 is connected to the negative terminal of the battery pack 24. A drain of the switching element Q1 is connected to the other end of the coil of the motor 22.

The controller 100 in the present embodiment is a known microcomputer. The controller 100 includes a CPU 102, a memory 104, and a not shown I/O port, etc. In the controller 100, the CPU 102 reads and executes programs of various processes stored in the memory 104 as a recording medium.

To the controller 100, corresponding detection signals are outputted respectively from the angle detector 110, the current detector 112 and the voltage detector 114. The angle detector 110 is a detection device that detects a rotation angle of a rotation shaft of the motor 22. The angle detector 110 is, for example, a rotary encoder attached to the rotation shaft of the motor 22, and outputs an angle detection signal (pulse) each time the rotation shaft of the motor 22 rotates a predetermined angle. The controller 100 calculates rotation speed which is rotation frequency of the motor 22 per unit time (e.g., 1 minute), based on the angle detection signal outputted from the angle detector 110.

The current detector 112 detects a current (referred to as a motor current) flowing to the motor 22, and outputs to the controller 100 a detection signal corresponding to a current value.

The voltage detector 114 detects a voltage (referred to as a battery voltage) of the battery pack 24, and outputs to the controller 100 a detection signal corresponding to a voltage value. The controller 100 calculates a remaining amount of power in the battery pack 24 based on the detection signal outputted from the voltage detector 114.

The controller 100 sets a target duty ratio of a PWM signal which turns on or off the switching element Q1 in accordance with the pulling amount of the trigger switch 46, in order to control the voltage applied to the motor 22. More particularly, the target duty ratio is increased in proportion to the pulling amount of the trigger switch 46. As the target duty ratio is increased, the rotation speed of the motor 22 is increased. Specifically, as the pulling amount of the trigger switch 46 is increased, the rotation speed of the mowing blade 36 is increased.

The gate circuit 120 turns on or off the switching element Q1 according to the PWM signal outputted from the controller 100. Thereby, the value of current to be supplied to the motor 22 is controlled so that electric power to be supplied to the motor 22 is controlled.

A constant voltage power circuit (Reg) 122 generates a predetermined voltage Vcc (e.g., 5VDC) from the voltage of the battery pack 24 and supply the voltage Vcc to the controller 100.

(Initial Acceleration Operation)

Now, an initial acceleration operation will be described which accelerates the motor 22 when an initial acceleration manipulation of pulling the trigger switch 46 is executed in a state in which the rotation of the motor 22 is stopped.

Figure 3:
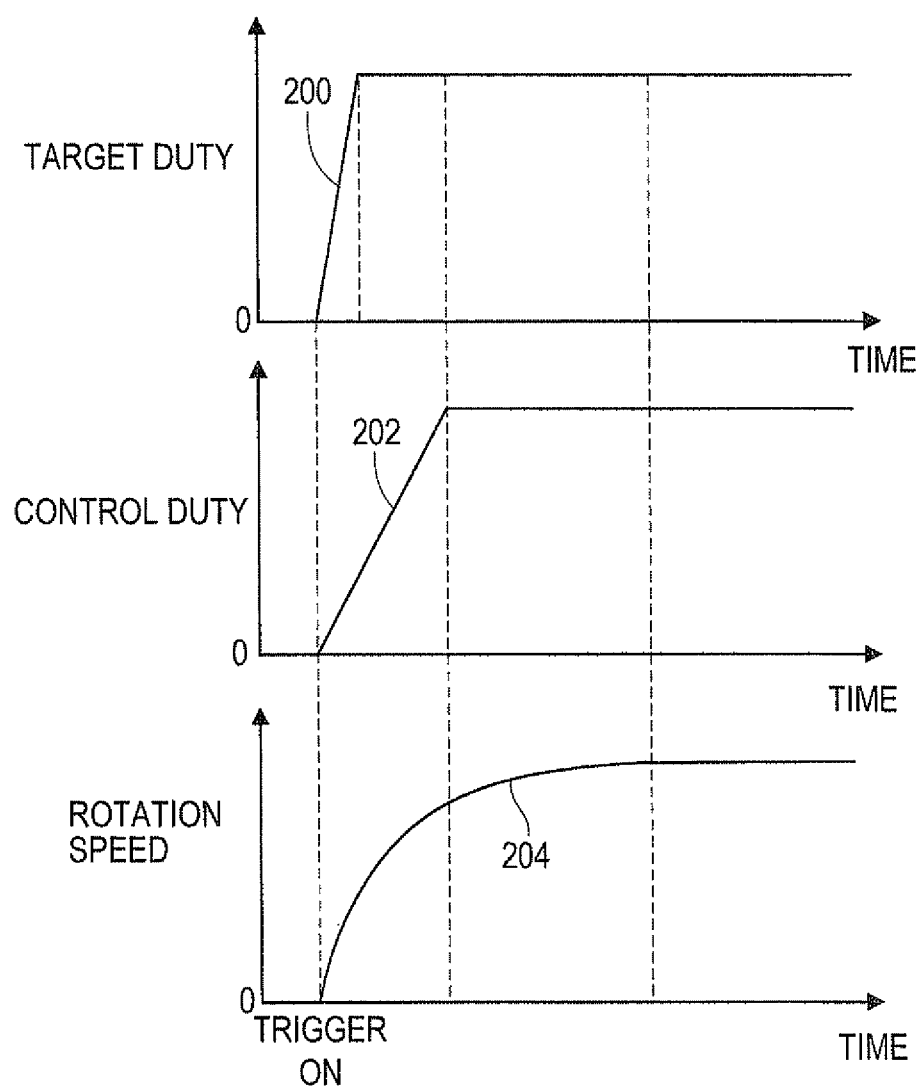
FIG. 3 is a characteristic diagram showing changes in target duty ratio, control duty ratio and rotation speed in an initial acceleration operation according to the first embodiment.

When the trigger switch 46 is pulled in a state in which rotation of the motor 22 is stopped, the controller 100, as shown in a solid line 200 in FIG. 3, sets the target duty ratio in accordance with the pulling amount of the trigger switch 46.

The target duty ratio is set per predetermined time intervals in accordance with the pulling amount of the trigger switch 46. Thus, in a period from when the trigger switch 46 is started to be pulled until the pulling amount of the trigger switch 46 is kept constant, a rate of change of the target duty ratio with respect to a time axis (slope of the target duty ratio) becomes larger and steeper as the speed to pull the trigger switch 46 becomes faster.

Then, as shown in a solid line 202 in FIG. 3, in accordance with time elapsed from start of the initial acceleration operation, the control duty ratio of the PWM signal which controls electric power supplied to the motor 22 is increased at a constant increasing rate. Together with the increase, the rotation speed of the motor 22 is increased, as shown in a solid line 204 in FIG. 3.

When the pulling amount of the trigger switch 46 is kept constant and the control duty ratio of the PWM signal reaches the target duty ratio set in accordance with the pulling amount of the trigger switch 46 at the time, the control duty ratio is maintained at the target duty ratio.

(Reacceleration Operation)

Now, a reacceleration operation will be described which reaccelerates the motor 22 when a reacceleration manipulation of pulling the trigger switch 46 is executed during deceleration of the motor 22, after executing a stopping manipulation of returning the trigger switch 46 to its initial position to stop the rotation of the motor 22.

Figure 4:
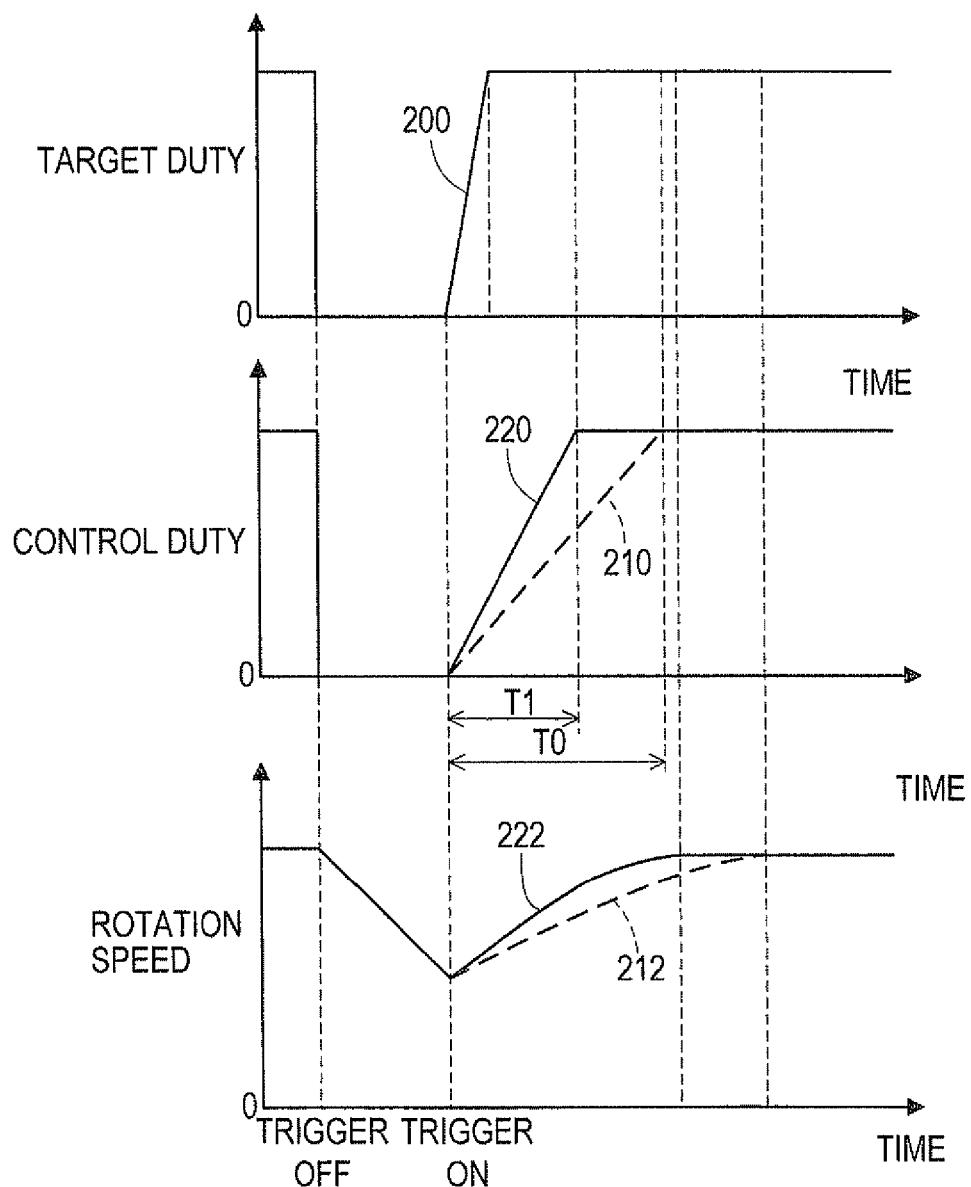
FIG. 4 is a characteristic diagram showing changes in target duty ratio, control duty ratio and rotation speed in a reacceleration operation according to the first embodiment.

When the stopping manipulation of the trigger switch 46 is performed (the trigger switch 46 is turned off) and conduction to the motor 22 is interrupted, the rotation speed of the motor 22 is gradually reduced, as shown in FIG. 4. Also, when the stopping manipulation of the trigger switch 46 is performed, the target duty ratio and the control duty ratio of the PWM signal controlling the voltage to be applied to the motor 22 is set to 0%.

As the reacceleration manipulation of the trigger switch 46 is performed (the trigger switch 46 is turned on) when the stopping manipulation of the trigger switch 46 is performed and the motor is being decelerated, the controller 100 sets the target duty ratio in accordance with the pulling amount of the trigger switch 46. If the pulling amount of the trigger switch 46 in the reacceleration manipulation is the same as that in the initial acceleration manipulation, the target duty ratio to be set (solid line 200) is the same.

As shown in a solid line 220 in FIG. 4, the controller 100, for example, increases the control duty ratio from 0% to the target duty ratio in accordance with elapsed time. Thereby, a current flowing to the motor 22 is increased in accordance with the elapsed time. The rotation speed of the motor 22 increases.

When the pulling amount of the trigger switch 46 is kept constant, and the control duty ratio of the PWM signal reaches the target duty ratio set in accordance with the pulling amount of the trigger switch 46 at the time, the control duty ratio is kept at the target duty ratio.

(Setting of the Control Duty Ratio)

When the initial acceleration manipulation is made, i.e., when the initial acceleration operation is started, the motor 22 is being stopped. Thus, if the control duty ratio is rapidly increased in the initial acceleration operation, reaction received by the electric power tool 10 from the motor 22 becomes large. Therefore, in the initial acceleration operation, an increasing rate of the control duty ratio is set so as to suppress the reaction received by the electric power tool 10 from the motor 22.

In contrast, when the reacceleration manipulation is made, i.e., when the reacceleration operation is started, the motor 22 and the mowing blade 36 are rotated although being decelerated, and have rotational energy. Thus, for example, as shown in the solid line 220 in FIG. 4, even if the control duty ratio is set at a higher increasing rate in the reacceleration operation than the control duty ratio in the initial acceleration operation shown in a dotted line 210, the reaction received by the electric power tool 10 from the motor 22 can be suppressed.

In the present embodiment, in the initial acceleration operation and the reacceleration operation, the control duty ratio is set based on a linear expression shown below.

$$\text{Control duty ratio } (D0)=(a0+a1)t+(b0+b1) \quad (1)$$

where t: elapsed time from when the initial acceleration operation or the reacceleration operation are started, a0: slope at the initial acceleration operation, b0: intercept at the initial acceleration operation, a1: slope increasing element set in the reacceleration operation, and b1: intercept increasing element set in the reacceleration operation.

As above, in the reacceleration operation, when the control duty ratio is calculated from the equation (1), at least one of the parameters, i.e., the slope (increasing rate) and the intercept, of the equation (1) is increased from the initial acceleration operation. Thus, the control duty ratio set for the reacceleration operation is larger than the control duty ratio set for the initial acceleration operation.

Accordingly, the control duty ratio, shown by the solid line 220, set at the higher increasing rate than the control duty ratio, shown by the dotted line 210, set at the increasing rate and the intercept in the initial acceleration operation reaches the target control ratio more quickly than the control duty ratio shown in the dotted line 210.

Thereby, the rotation speed of the motor 22 when the control duty ratio shown by the solid line 220 is set (see reference number 222) increases more rapidly than the rotation speed of the motor 22 when the control duty ratio shown by the dotted line 210 is set (see reference number 212). The rotation speed corresponding to the target duty ratio is achieved.

Also, when the reacceleration operation is started, the control duty ratio is not immediately set in the target duty ratio, but is increased in accordance with the elapsed time to reach the target duty ratio. Thus, the reaction received by the electric power tool 10 from the motor 10 can be suppressed as much as possible.

(Other Reacceleration Process)

In the reacceleration operation shown in FIG. 4, the intercept is not increased by setting b1=0 in the equation (1) for the initial acceleration operation. The slope is increased by adding a1 to a0.

Figure 5:
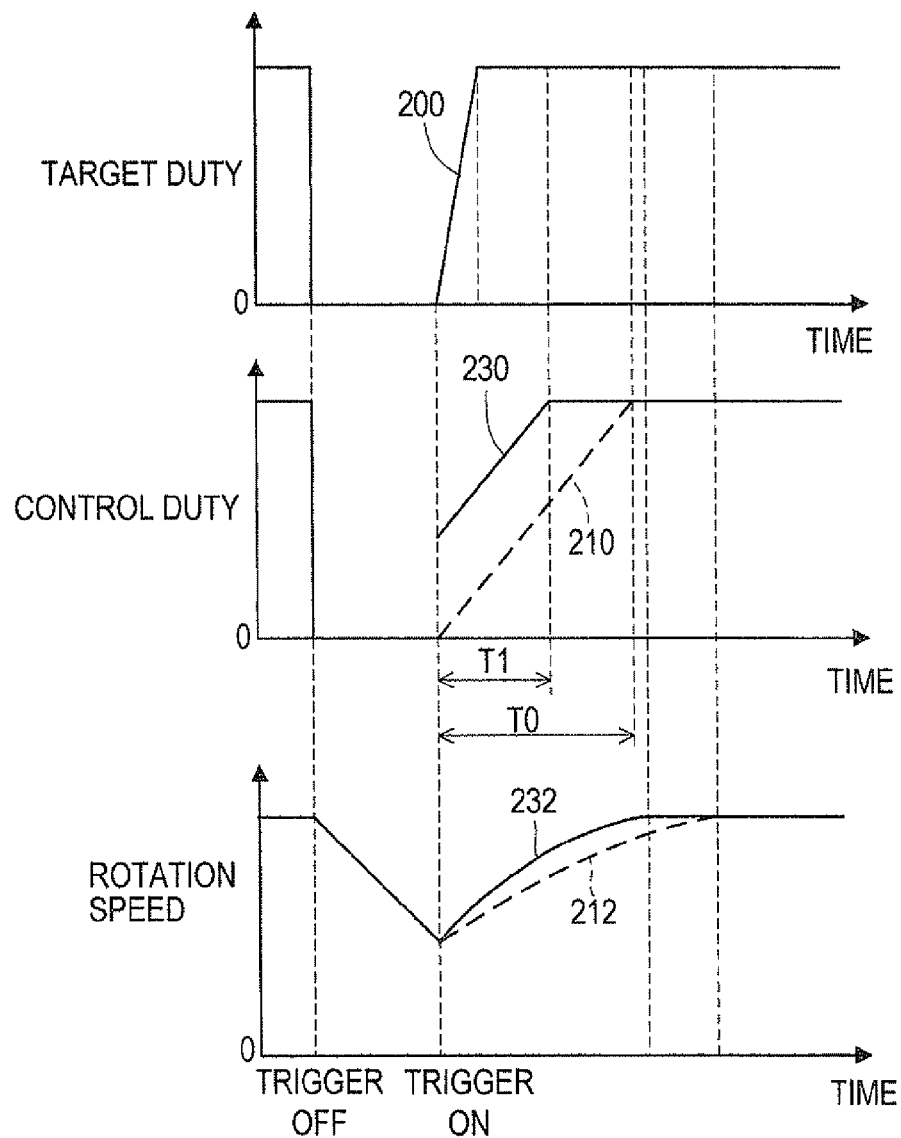
FIG. 5 is a characteristic diagram showing changes in target duty ratio, control duty ratio and rotation speed in another reacceleration operation according to the first embodiment.

In contrast, in the setting of the control duty ratio in the reacceleration operation shown by a solid line 230 in FIG. 5, the slope (increasing rate) is not increased by setting a1=0 in the equation (1) for the initial acceleration operation. However, the intercept is increased by adding b1 to b0. In FIGS. 4 and 5, b0=0.

In the reacceleration operation shown in FIG. 5 as well, the control duty ratio shown by the solid line 230 set at the larger intercept than that of the control duty ratio shown by the dotted line 210 set at the increasing rate and intercept in the initial acceleration operation reaches the target duty ratio more quickly than the control duty ratio shown by the dotted line 210.

Thereby, the rotation speed of the motor 22 when the control duty ratio shown by the solid line 230 is set (see reference number 232) increases more rapidly than the rotation speed of the motor 22 when the control duty ratio shown by the dotted line 210 is set (see reference number 212). The rotation speed corresponding to the target duty ratio is reached.

In either of the cases shown in FIGS. 4 and 5, in the reacceleration operation, at least one of the slope and the intercept which are the parameters of the equation (1) is increased, compared to the initial acceleration operation. Thus, the control duty ratio set for the reacceleration operation is larger than the control duty ratio set for the initial acceleration operation.

Accordingly, in the reacceleration operation, assuming that the time to reach the target duty ratio after the reacceleration manipulation is performed in the case of setting the same values of the parameters as those in the initial acceleration operation is T0, and the time to reach the target duty ratio after the reacceleration manipulation is performed in the case of increasing at least one of the slope and the intercept which is the parameter of the equation (1) is T1, it leads T0>T1, as shown in FIGS. 4 and 5. In this way, since the control duty ratio rapidly reaches the target duty ratio, the rotation speed of the motor also increases rapidly.

In the reacceleration operation shown by the solid line 230 in FIG. 5, the slope in the equation (1) is set to be the same as that in the initial acceleration operation. Thus, the maximum angle acceleration of the motor 22 in the reacceleration operation is the same as that in the initial acceleration operation. As a result, the reaction received by the electric power tool 10 from the motor 22 in the reacceleration operation can be the same as the reaction received by the electric power tool 10 from the motor 22 in the initial acceleration operation.

(Process by the Controller 100)

Next, a process executed by the controller 100 (more particularly, the CPU 102) in order to achieve the above-described motor control will be described based on flowcharts.

Figure 6:
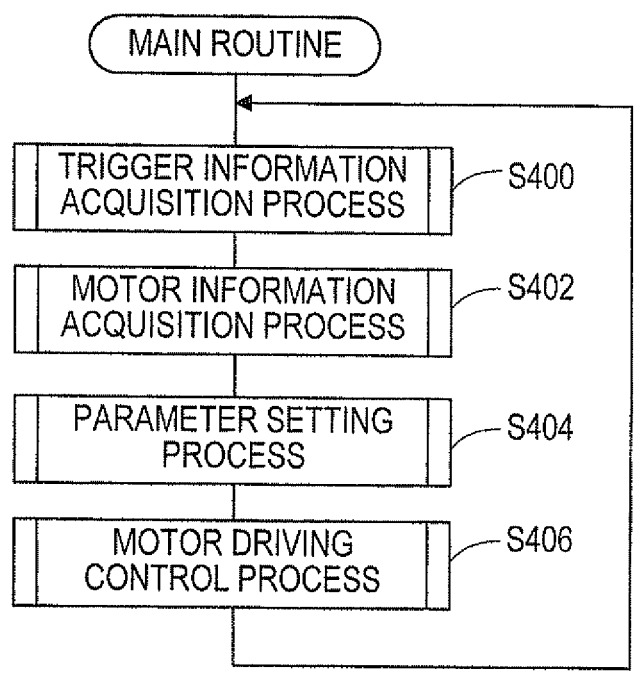
FIG. 6 is a flowchart illustrating a main routine according to the first embodiment.

In a main routine shown in FIG. 6, a trigger information acquisition process (S400), a motor information acquisition process (S402), a parameter setting process (S404), and a motor drive control process (S406) are sequentially and repetitively executed.

In the trigger information acquisition process in S400, the manipulation signal indicating whether or not the trigger switch 46 has been pulled and the voltage signal corresponding to the pulling amount from the initial position of the trigger switch 46 are acquired as manipulation information with respect to the trigger switch 46.

In the motor information acquisition process in S402, the rotation angle of the motor 22, the motor current, the battery voltage are acquired from the angle detector 110, the current detector 112 and the voltage detector 114, respectively, as motor information indicating an operation state of the motor 22, in order to set parameters to determine the control duty ratio. The controller 100 calculates the rotation speed and the angle acceleration of the motor 22 from the rotation angle of the motor 22, and the remaining amount of power in the battery pack 24 from the battery voltage.

In the parameter setting process in S404, the parameters to determine the control duty ratio which PWM controls a voltage to be applied to the motor 22 are set.

In the motor drive control process in S406, the voltage PWM controlled by the control duty ratio determined by the parameters set in S404 is applied to the motor 22.

(Parameter Setting Process)

Figure 7:
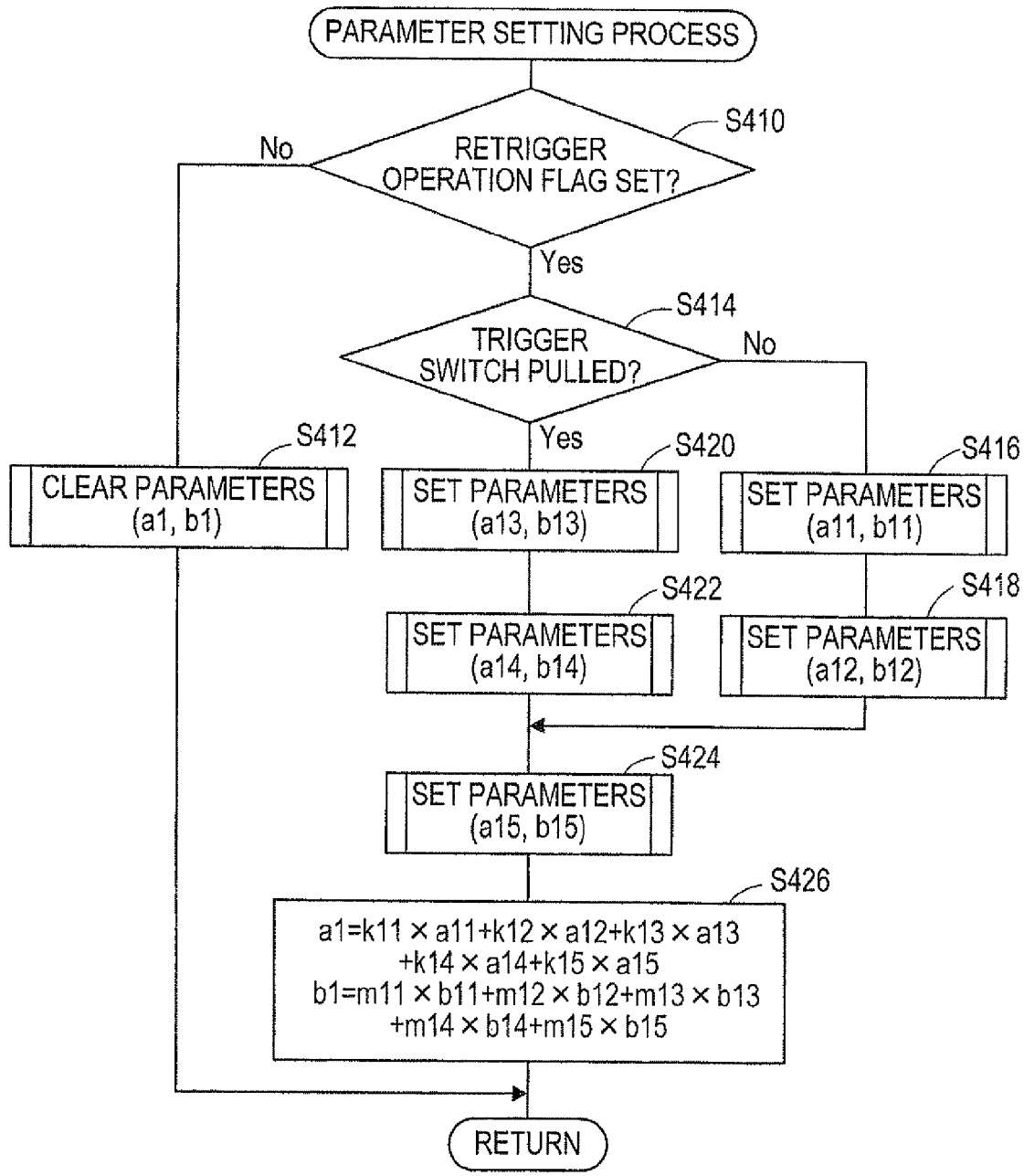
FIG. 7 is a flowchart illustrating a parameter setting process according to the first embodiment.

Hereinafter, the parameter setting process executed in S404 of a main routine will be described by way of FIG. 7.

Firstly, it is determined whether or not a reacceleration (retrigger) operation flag is set (S410). The reacceleration operation flag is to be set or cleared in S436 and S438 of the later-described motor drive control process (see FIG. 8). If the motor 22 is being rotated when the trigger switch 46 is not pulled, the reacceleration operation flag is set to '1'. If the motor 22 is being stopped when the trigger switch 46 is not pulled, the reacceleration operation flag is cleared to '0'. Accordingly, if the trigger switch 46 is pulled when the reacceleration operation flag is set, it can be determined that the reacceleration manipulation is made.

If the reacceleration operation flag is not set (S410: No), it is determined that the current process is a process of setting the control duty ratio for the operation which is not the reacceleration operation. The parameters a1 and b1 of the aforementioned equation (1) are both cleared to '0' (S412).

If the reacceleration operation flag is set (S410: Yes), it is determined that the current process may be a process of setting the control duty ratio for the reacceleration operation. It is then determined whether or not the trigger switch 46 is pulled (S414).

When the trigger switch 46 is not pulled although the reacceleration operation flag is set (S414: No), it is determined that the motor 22 is being decelerated. In S416 and S418, magnitude of the load applied to the motor 22 is measured based on the change in rotation speed of the motor 22 during a deceleration period before the reacceleration operation. It is then set to what extent a1 and b1 in the equation (1) are to be increased when the reacceleration operation is made.

Parameters a11 to a15 and b11 to b15 are used in equations (2) and (3) below to set a1 and b1 in the equation (1). In the equations (2) and (3), the respective parameters a11 to a15 and b11 to b15 are multiplied by weight coefficients k11 to k15 and m11 to m15, respectively, and sums of the multiplied a11 to a15 and b11 to b15 are calculated as a1 and b1. The weight coefficients k11 to k15 and m11 to m15 are set in accordance with a11 to a15 and b11 to b15.

$$a1 = k11 \times a11 + k12 \times a12 + k13 \times a13 + k14 \times a14 + k15 \times a15 \quad (2)$$

$$b1 = m11 \times b11 + m12 \times b12 + m13 \times b13 + m14 \times b14 + m15 \times b15 \quad (3)$$

Particularly, in S416, a11 used for calculation of a1 and b11 used for calculation of b1 are set from an absolute value of the angle acceleration of the motor 22 during the deceleration period. If the absolute value of the angle acceleration during the deceleration period is large, the load received by the motor 22 can be considered large. Thus, the larger the absolute value of the angle acceleration during the deceleration period is, that is, the larger the load received by the motor 22 is, the larger values are set in a11 and b11.

Also, in S418, a12 in the equation (2) and b12 in the equation (3) are set from elapsed time from when the trigger switch 46 is released and an amount of reduction in the rotation speed. The elapsed time and the amount of reduction in the rotation speed may be measured by sequentially measuring the amount of reduction in the rotation speed at predetermined time intervals. The latest measurement result may be used for setting a12 and b12. Or, the overall elapsed time from when the trigger switch 46 is released and the amount of reduction in the rotation speed may be measured. Result of the measurement may be used for setting a12 and b12. The predetermined time intervals or the overall elapsed time may be measured by an internal timer of the CPU 102.

For example, as the amount of reduction in the rotation speed at the predetermined time intervals is larger, the load received by the motor 22 can be determined larger. Thus, the larger the amount of reduction in the rotation speed at the predetermined time intervals, that is, the larger the load received by the motor 22 is, the larger values are set in a12 and b12.

When a11 and b11 and a12 and b12 are set in S416 and S418, the process moves to S424.

If the trigger switch 46 is pulled in S414 (S414: Yes), it is determined that the reacceleration manipulation is made. In S420, a13 and b13 in the equations (2) and (3) are set based on the rotation speed of the motor 22 at the time when the trigger switch 46 is pulled to start the reacceleration manipulation.

As the rotation speed of the motor 22 when the reacceleration manipulation is started is faster, the reaction received from the motor 22 is smaller even if the large control duty ratio is set. Thus, larger values are set in a13 and b13.

Subsequently in S422, a14 and b14 in the equations (2) and (3) are set based on the motor current flowing to the motor 22 when the reacceleration operation is being executed. A value of the current flowing to the motor 22 is larger as the load received by the motor 22 is larger. Accordingly, the larger the motor current during the reacceleration operation is, that is, the larger the load received by the motor 22 is, the larger values are set in a14 and b14.

Subsequently, in S424, a15 and b15 in the equations (2) and (3) are set based on the remaining amount of power in the battery pack 24.

If the control duty ratio is the same, the smaller the remaining amount of power in the battery pack 24 is, the lower voltage is applied to the motor 22. Accordingly, as the remaining amount of power in the battery pack 24 is smaller, the control duty ratio may be set larger so as to inhibit lowering of the voltage to be applied to the motor 22. Thus, the smaller the remaining amount of power is, the larger values are set in a15 and b15.

Using a11 to a15 and b11 to b15 set in S416 to S424, a1 and b1 in the equation (1) are calculated from the equations (2) and (3) in S426.

(Motor Drive Control Process)

Figure 8:
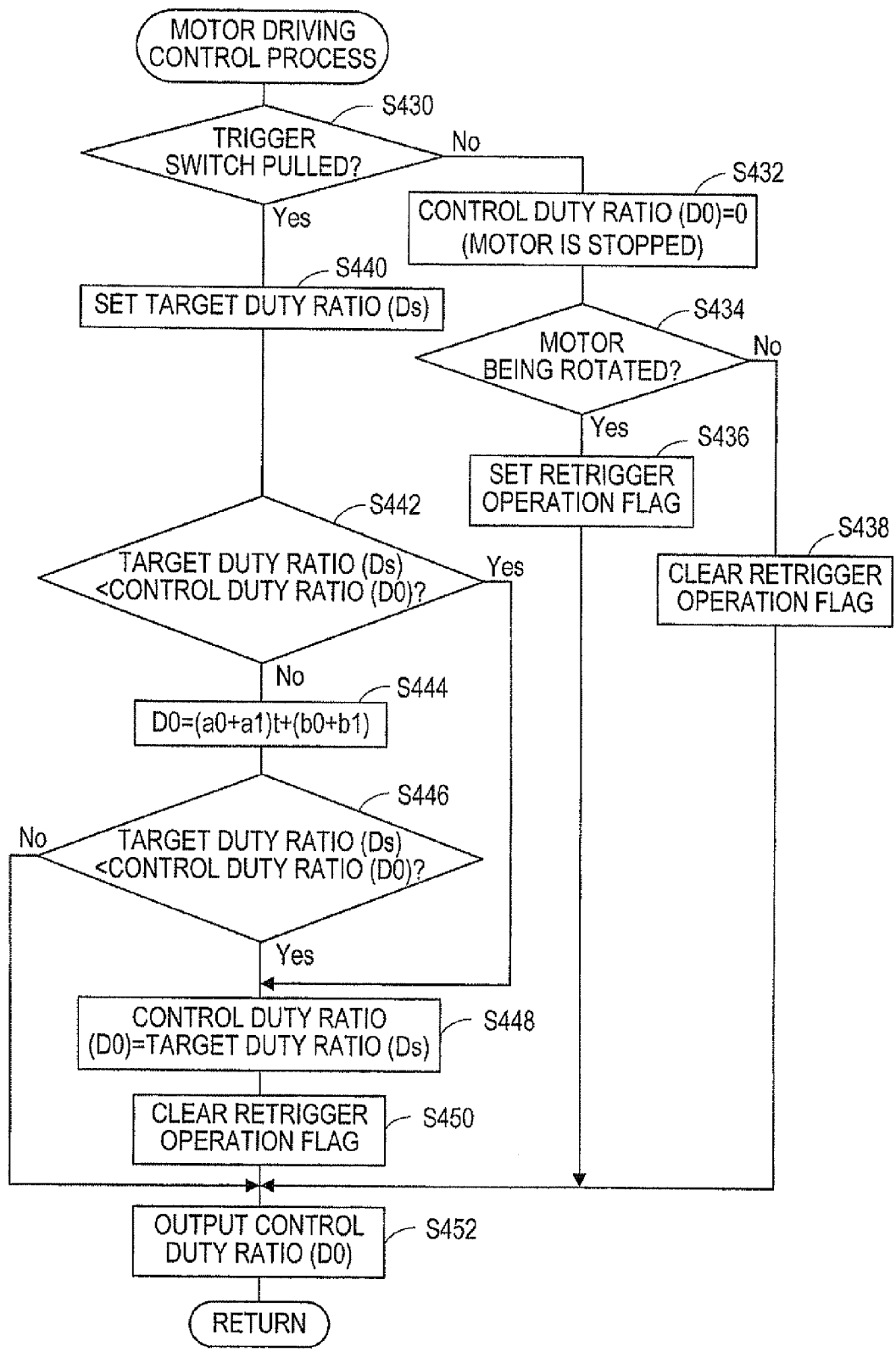
FIG. 8 is a flowchart illustrating a motor drive control process according to the first embodiment.

Hereinafter, the motor drive control process executed in S406 of the main routine will be described by way of FIG. 8.

When the motor drive control process is started, firstly it is determined whether or not the trigger switch 46 is pulled (S430). If the trigger switch 46 is not pulled, that is, when the stopping manipulation of the trigger switch 46 is performed (S430: No), a brake process is executed which stops rotation of the motor 22 (S432).

In the brake process, the control duty ratio of the PWM signal which controls the electric power to be supplied to the motor 22 is set to 0%. Conduction to the motor 22 is stopped.

Subsequent to the brake process, it is determined whether or not the motor 22 is being rotated based on the detection signal of the angle detector 110 which detects the rotation angle of the motor 22 (S434). Whether or not the motor 22 is being rotated may be determined by either determining whether or not the rotation speed of the motor 22 has reduced to or below a predetermined speed or determining whether or not the rotation speed of the motor 22 has become zero (0).

If the motor 22 is being rotated (S434: Yes), the reacceleration (retrigger) operation flag is set (S436). If the motor 22 is stopped (S434: No), the reacceleration operation flag is cleared (S438). The process moves to S452.

If the trigger switch 46 is pulled in S430 (S430: Yes), the target duty ratio (Ds) is set based on the pulling amount of the trigger switch 46 (S440).

Subsequently, it is determined whether or not the control duty ratio (D0) is larger than the target duty ratio (Ds) (S442). If the control duty ratio (D0) is larger than the target duty ratio (Ds) (S442: Yes), the process moves to S448 in order to set the control duty ratio to be the same as the target duty ratio.

When the control duty ratio (D0) is equal to or smaller than the target duty ratio (Ds) (S442: No), a1 and b1 set in S426 of the above-described parameter setting process are used to calculate the control duty ratio (D0) from the equation (1) (S444). In the equation (1), a1 and b1 are zero (0) in the motor drive control process other than the reacceleration operation. a0 and b0 are fixed values for setting the control duty ratio in the motor drive control process other than the reacceleration operation.

Subsequently, it is determined whether or not the control duty ratio (D0) calculated from the equation (1) is larger than the target duty ratio (Ds) (S446). If the control duty ratio (D1) is equal to or smaller than the target duty ratio (Ds) (S446: No), the process moves to S452.

If the control duty ratio (D0) is larger than the target duty ratio (Ds) (S446: Yes), the target duty ratio is set as the control duty ratio (S448). It is determined that the reacceleration operation is ended, and the reacceleration operation flag is cleared (S450).

In S452, the control duty ratio set in S442 to S450 is outputted to control the voltage applied to the motor 22.

In the above-described first embodiment, in both the initial acceleration operation and the reacceleration operation, the control duty ratio is calculated by the linear expression using elapsed time from when each acceleration manipulation is made as a variable. As a parameter to be set in the reacceleration operation, at least one of the coefficient (i.e., slope) and intercept in the linear expression expressed by the equation (1) is set larger than the value set in the initial acceleration operation.

Thereby, the control duty ratio set for the reacceleration operation is larger than the control duty ratio set for the initial acceleration operation. As a result, the rotation speed of the motor 22 can be rapidly increased as compared to the case of setting the same values as those in the initial acceleration operation to the parameters in the reacceleration operation. The rotation speed corresponding to the target duty ratio can be achieved.

As a result, in the case of especially repeating turning on and off of the trigger switch 46 to execute the reacceleration operation repetitively, the rotation speed of the motor 22 is quickly increased in the reacceleration operation each time. Thus, usability of the electric power tool 10 is improved.

In the first embodiment, the trigger switch 46 corresponds to one example of the manipulation unit of the present invention. The electric power tool 10 corresponds to one example of the electric power tool of the present invention. The controller 100 corresponds to one example of the duty ratio control device. The CPU 102 corresponds to one example of the duty ratio calculation unit and the parameter setting unit of the present invention. The gate circuit 120 and the switching element Q1 correspond to one example of the drive unit of the present invention.

Also, S440, S444 and S448 in the motor drive control process correspond to an example of the duty ratio calculation process of the present invention. S412 and S416 to S426 in the parameter setting process correspond to an example of the parameter setting step in the present invention.

[Second Embodiment]

In the first embodiment, the control duty ratio applied to the motor 22 is set based on the linear expression shown as the equation (1). In contrast, in the second embodiment, the control duty ratio is feedback controlled based on difference between the target rotation speed and an actual rotation speed of the motor 22. The feedback control in the second embodiment is so-called PI control.

In the second embodiment, the control duty ratio (D0) is set by an equation (4) below.

$$\text{the control duty ratio } (D0) = (c0+c1) \times \text{deviation} + (d0+d1) \times \text{integral of deviation} \quad (4)$$

where deviation: difference between the target rotation speed and the actual rotation speed, c0: proportional gain at the time of the initial acceleration operation, d0: integral gain at the time of the initial acceleration operation, c1: increasing element of the proportional gain set in the reacceleration operation, and d1: increasing element of the integral gain set in the reacceleration operation.

As above, in the reacceleration operation, when the control duty ratio is calculated from the equation (4), at least one of the proportional gain and the integral gain which are the parameters of the equation (4) increases, by setting at least one of c1 and d1 compared with the initial acceleration operation.

Accordingly, the control duty ratio (D0) calculated using feedback gains set in the reacceleration operation is larger than the control duty ratio calculated in the reacceleration operation by using the same feedback gains as those in the initial acceleration operation. As a result, in the reacceleration operation, the rotation speed of the motor 22 can rapidly reach the target rotation speed.

Figure 9:
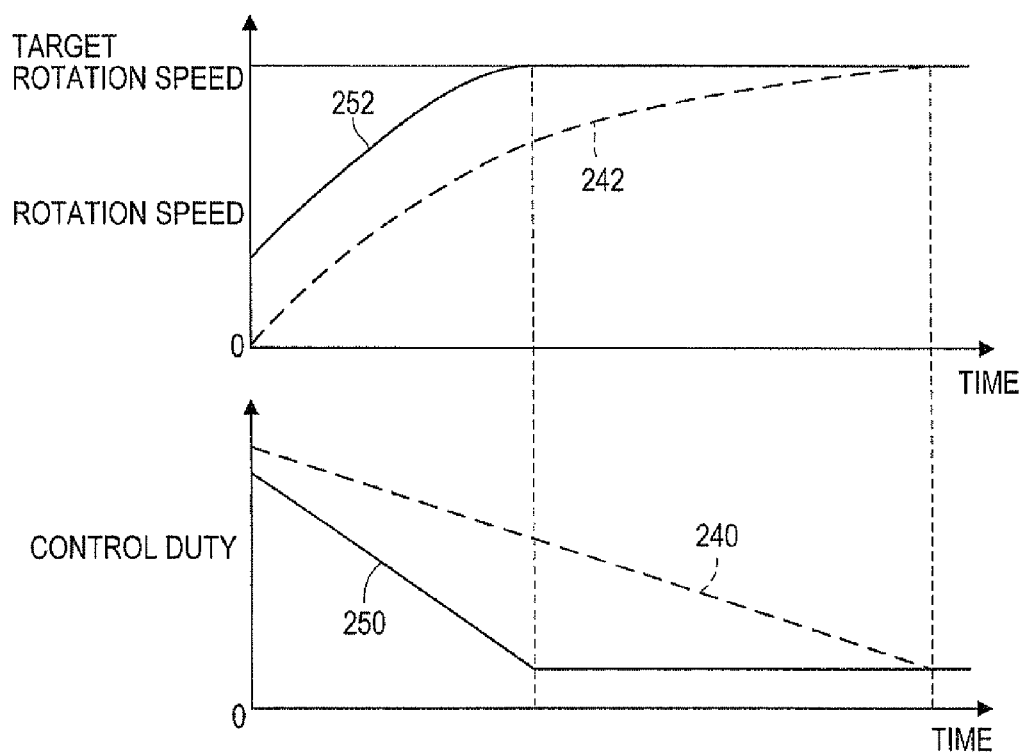
FIG. 9 is a characteristic diagram showing changes in rotation speed and control duty ratio in a reacceleration operation and an initial acceleration operation according to a second embodiment.

FIG. 9 shows characteristics of the rotation speed and the control duty ratio in the initial acceleration operation and in the reacceleration operation. A dotted line 240 indicates the control duty ratio in the initial acceleration operation. A dotted line 242 indicates the rotation speed in the initial acceleration operation. A solid line 250 indicates the control duty ratio in the reacceleration operation. A solid line 252 indicates the rotation speed in the reacceleration operation.

The control duty ratio in the initial acceleration operation shown in the dotted line 240 is larger than the control duty ratio in the reacceleration operation shown in the solid line 250. This is because, since the rotation speed in the initial acceleration operation starts from 0, the deviation in the equation (4) is larger than that in the reacceleration operation.

However, in the reacceleration operation, if the control duty ratio is calculated under the condition that c1 and d1 are 0 as in the initial acceleration operation, the control duty ratio in the reacceleration operation becomes smaller than the control duty ratio shown by the solid line 250 which is set such that at least one of the proportional gain and the integral gain is increased as compared to that in the initial acceleration operation.

Figure 10:
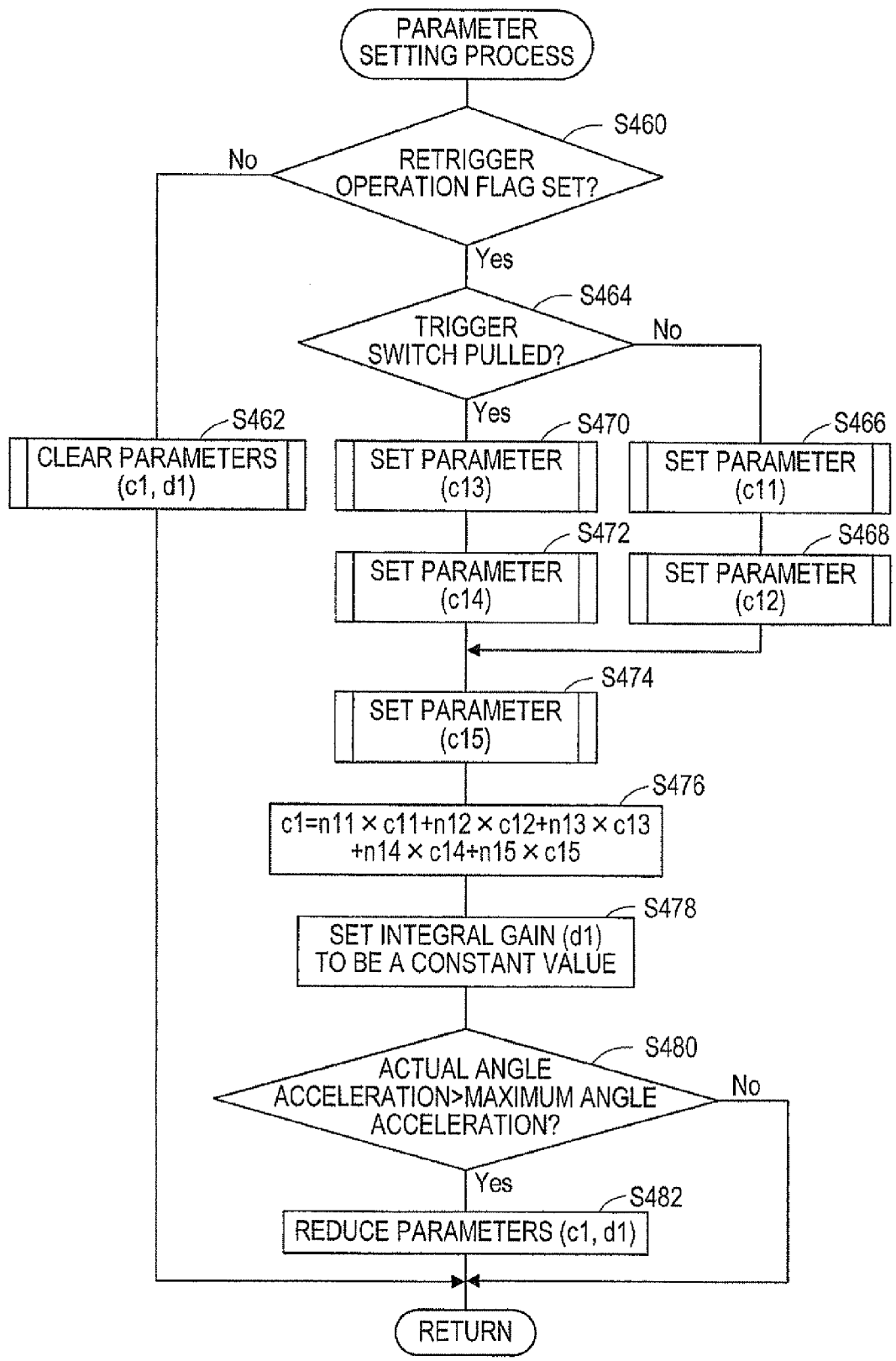
FIG. 10 is a flowchart illustrating a parameter setting process according to the second embodiment.
Figure 11:
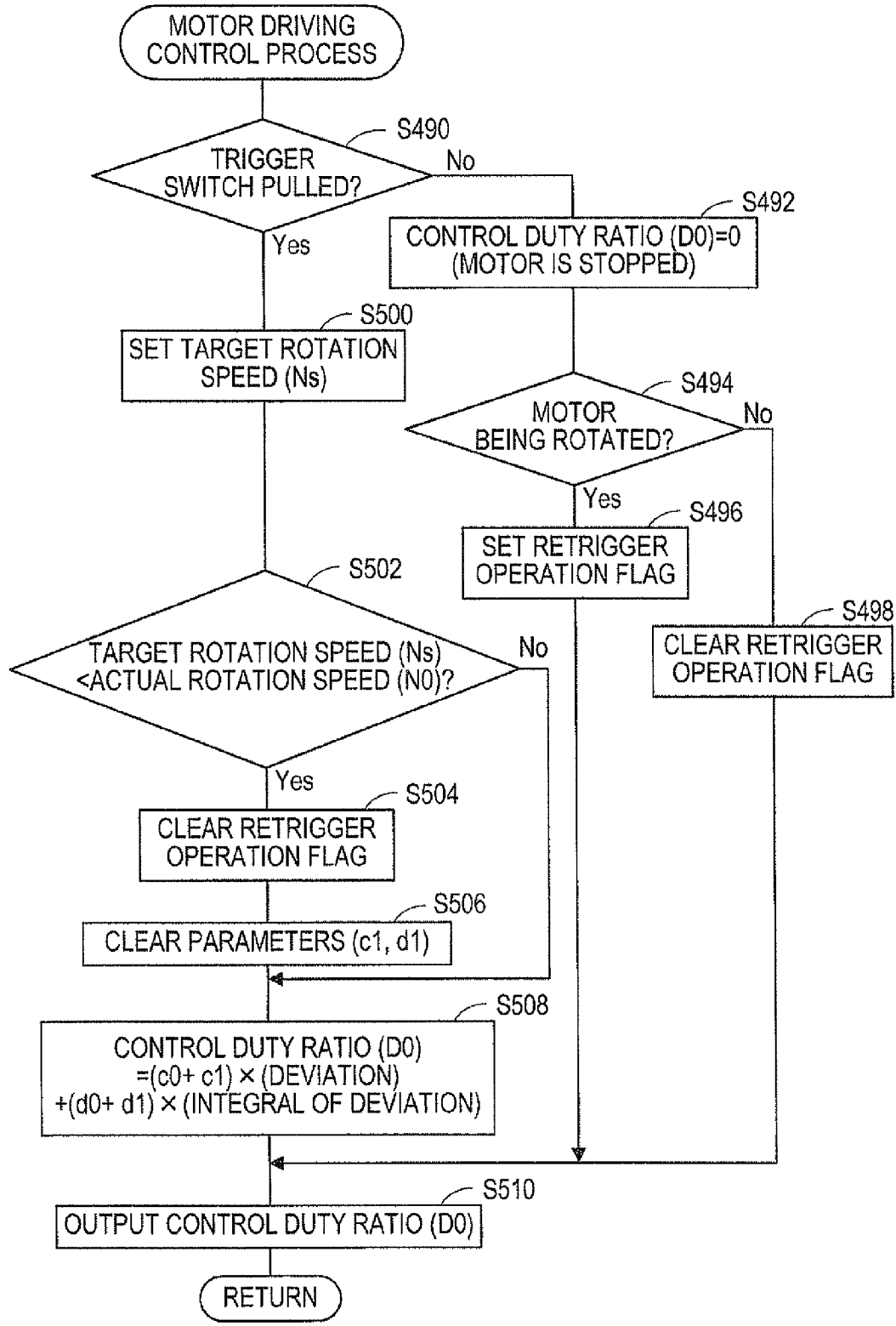
FIG. 11 is a flowchart illustrating a motor drive control process according to the second embodiment.

Next, by way of FIGS. 10 and 11, the setting process of the control duty ratio and the motor drive control process in the second embodiment will be described.

(Parameter Setting Process)

Hereinafter, the parameter setting process according to the second embodiment executed in S404 of the main routine will be described by way of FIG. 10.

Firstly, it is determined whether or not the reacceleration (retrigger) operation flag is set (S460). Similar to the first embodiment, the reacceleration operation flag is set to '1' if the motor 22 is being rotated when the trigger switch 46 is not pulled. If the motor 22 is stopped when the trigger switch 46 is not pulled, the reacceleration operation flag is cleared to '0'. Accordingly, if the trigger switch 46 is pulled when the reacceleration operation flag is set, it can be determined that the reacceleration manipulation is made.

If the reacceleration operation flag is not set (S460: No), it is determined that the current process is a process of setting the control duty ratio for the operation which is not the reacceleration operation. The parameters c1 and d1 of the aforementioned equation (4) are both cleared to '0' (S462).

If the reacceleration operation flag is set (S460: Yes), it is determined that the current process may be a process of setting the control duty ratio for the reacceleration operation. It is then determined whether or not the trigger switch 46 is pulled (S464).

When the trigger switch 46 is not pulled although the reacceleration operation flag is set (S464: No), it is determined that the motor 22 is being decelerated. In S466 and S468, magnitude of the load applied to the motor 22 is measured based on the change in rotation speed of the decelerating motor 22 before the reacceleration operation. Then, to what extent c1 in the equation (4) is to be increased is set.

Below explained parameters c11 to c15 are used in an equation (5) below to set c1 in the equation (4). In the equation (5), the respective parameters c11 to c15 is multiplied by weight coefficients n11 to n15, respectively, and a sum of the multiplied c11 to c15 is calculated as c1. The weight coefficients n11 to n15 are set in accordance with c11 to c15.

$$c1 = n11 \times c11 + n12 \times c12 + n13 \times c13 + n14 \times c14 + n15 \times c15 \quad (5)$$

Particularly, in S466, c11 used for calculation of c1 is set from the absolute value of the angle acceleration of the decelerating motor 22. If the absolute value of the angle acceleration of the decelerating motor 22 is larger, the load received by the motor 22 can be considered large. Thus, the larger the absolute value of the angle acceleration of the decelerating motor 22 is, that is, the larger the load received by the motor 22 is, the larger value is set in c11.

Also, in S468, c12 in the equation (5) is set from elapsed time from when the trigger switch 46 is released and an amount of reduction in the rotation speed of the motor 22. The elapsed time and the amount of reduction in the rotation speed may be measured by sequentially measuring the amount of reduction in the rotation speed at predetermined time intervals. The latest measurement result may be used for setting c12. Or, the overall elapsed time from when the trigger switch 46 is released and the amount of reduction in the rotation speed may be measured. The measurement result may be used for setting c12.

For example, as the amount of reduction in the rotation speed at the predetermined time intervals is larger, the load received by the motor 22 can be determined larger. Thus, the larger the amount of reduction in the rotation speed at the predetermined time intervals, that is, the larger the load received by the motor 22 is, the larger value is set in c12, When c11 and c12 are set in S466 and S468, the process moves to S474.

If the trigger switch 46 is pulled in S464 (S464: Yes), it is determined that the reacceleration manipulation is made. In S470, c13 in the equation (5) is set based on the rotation speed of the motor 22 at the time when the trigger switch 46 is pulled to start the reacceleration manipulation.

As the rotation speed of the motor 22 when the reacceleration manipulation is started is faster, the reaction received from the motor 22 is smaller even if the large control duty ratio is set. Thus, a larger value is set in c13.

Subsequently in S472, c14 in the equation (5) is set based on the motor current flowing to the motor 22 when the reacceleration operation is being executed. A value of the current flowing to the motor 22 is larger as the load received by the motor 22 is larger. Accordingly, the larger the motor current during the reacceleration operation is, that is, the larger the load received by the motor 22 is, the larger value is set in c14.

Subsequently, in S474, c15 in the equation (5) is set based on the remaining amount of power in the battery pack 24.

If the control duty ratio is the same, the smaller the remaining amount of power in the battery pack 24 is, the lower voltage is applied to the motor 22. Accordingly, as the remaining amount of power in the battery pack 24 is smaller, the control duty ratio may be set larger so as to inhibit lowering of the voltage to be applied to the motor 22. Thus, the smaller the remaining amount of power is, the larger value is set in c15.

Using c11 to c15 set in S476 to S474, c1 in the equation (4) is calculated from the equation (5) in S476.

Upon calculation of c1 which is the increasing element of the proportional gain in the equation (4), d1 (d1≥0) which is the increasing element of the integral gain is set to be a constant value, regardless of the value of c1 (S478).

Subsequently, it is determined whether or not the actual angle acceleration is larger than a maximum angle acceleration preset in the initial acceleration operation (S480). If the actual angle acceleration is equal to or smaller than the maximum angle acceleration (S480: No), the values of c1 and d1 set in S476 and S478 are not changed. As the maximum angle acceleration compared with the actual angle acceleration in S480, a maximum angle acceleration upon the initial acceleration manipulation with the mowing blade of a maximum conceivable weight without external load is set, for example.

When the actual angle acceleration is larger than the maximum angle acceleration (S480: Yes), at least one of c1 and d1 set in S476 and S478 is decreased such that the reaction received from the motor 22 in the reacceleration operation is not to be larger than the reaction received from the motor 22 in the initial acceleration operation (S482).

(Motor Drive Control Process)

Hereinafter, the motor drive control process executed in S406 of the main routine will be described by way of FIG. 11.

When the motor drive control process is started, firstly it is determined whether or not the trigger switch 46 is pulled (S490). If the trigger switch 46 is not pulled, that is, when the stopping manipulation of the trigger switch 46 is performed (S490: No), S492 to S498 are executed. S492 to S498 are substantially identical to S442 to S448 in FIG. 8. After execution of S496 and S498, the process moves to S510.

If the trigger switch 46 is pulled in S490 (S490: Yes), the target rotation speed (Ns) is set based on the pulling amount of the trigger switch 46 (S500).

Subsequently, it is determined whether or not the actual rotation speed (N0) is faster than the target rotation speed (Ns) (S502). If the actual rotation speed (N0) is equal to or smaller than the target rotation speed (Ns) (S502: No), the process moves to S508.

If the actual rotation speed (N0) is faster than the target rotation speed (Ns) (S502: Yes), it is determined that the actual rotation speed (N0) has reached the target rotation speed (Ns). The reacceleration operation flag is cleared (S504); The parameters c1 and d1 for calculating the control duty ratio are cleared to '0' (S506).

Subsequently, the control duty ratio (D0) is calculated by the equation (4) (S508). The calculated control duty ratio is outputted to control the voltage to be applied to the motor 22 (S510).

In the above-described second embodiment, the control duty ratio to be feedback controlled based on the difference between the target rotation speed of the motor and the actual rotation speed of the motor 22 corresponding to the initial acceleration manipulation and the reacceleration manipulation is calculated. As the parameter set for the reacceleration operation, at least one value of the at least one feedback gain in the feedback control is set larger than the value set in the initial acceleration operation.

Thereby, the control duty ratio calculated by using the feedback gains set in the reacceleration operation is larger than the control duty ratio in the reacceleration operation calculated by using the same feedback gains set in the initial acceleration operation. As a result, the rotation speed of the motor 22 can be rapidly increased to reach the target rotation speed in the reacceleration operation.

Also, in the reacceleration operation, the proportional gain of the proportional term of the feedback control is set larger than the value set in the initial acceleration operation. Thus, the rotation speed of the motor 22 can be rapidly increased to reach the target rotation speed.

As a result, even in the case of especially repeating turning on and off of the trigger switch 46 and executing the reacceleration operation repetitively, the rotation speed of the motor 22 quickly reaches to the target rotation speed in the reacceleration operation each time. Thus, usability of the electric power tool 10 is improved.

In the second embodiment, S508 of the motor drive control process corresponds to one example of the duty ratio calculation step of the present invention. S462 and S466 to S482 of the parameter setting process and S506 of the motor drive control process correspond to one example of the parameter setting step of the present invention.

(Other Acceleration Operation Including Feedback Control)

In the initial acceleration operation and the reacceleration operation shown in FIG. 9, only the ultimate target rotation speed is set with respect to the pulling amount of the trigger switch 46. In contrast, in the initial acceleration operation and the reacceleration operation including feedback control shown in FIG. 12, when the trigger switch 46 is manipulated to change the pulling amount of the trigger switch 46, a voltage signal (speed command value) outputted by the trigger switch 46 in accordance with the pulling amount is detected per predetermined time intervals. Depending on the detected speed command value, the target rotation speed is sequentially set.

Figure 12:
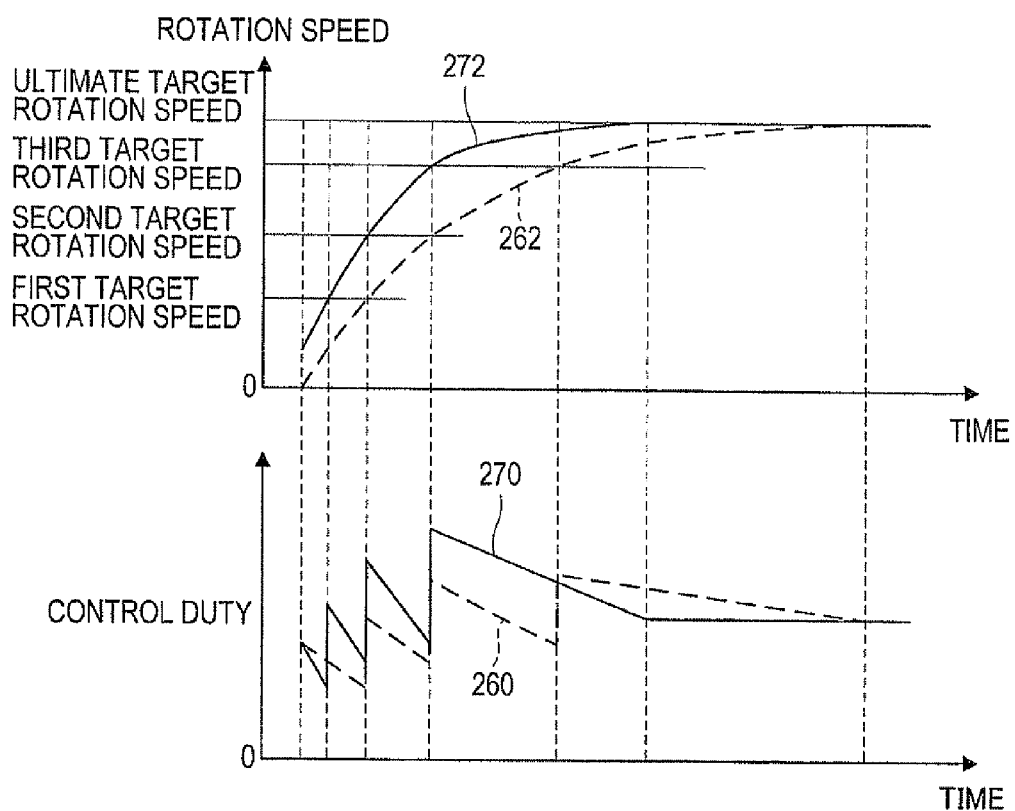
FIG. 12 is another characteristic diagram showing changes in rotation speed and control duty ratio in another reacceleration operation and initial acceleration operation with feedback control.

A dotted line 260 in FIG. 12 indicates the control duty ratio in the initial acceleration operation. A dotted line 262 indicates the rotation speed in the initial acceleration operation. A solid line 270 indicates the control duty ratio in the reacceleration operation. A solid line 272 indicates the rotation speed in the reacceleration operation.

As above, by detecting per predetermined time intervals the speed command value of the trigger switch 46 which changes in accordance with the pulling amount and by gradually increasing the target rotation speed until the ultimate target rotation speed is reached, the deviation between the target rotation speed and the actual rotation speed becomes small. Thereby, rapid increase in the control duty ratio calculated by the equation (4) and rapid increase in the actual rotation speed are suppressed. The reaction received from the motor 22 can be reduced.

Even in the initial acceleration operation and the reacceleration operation shown in FIG. 12, the control duty ratio (D0) calculated by using the feedback gains set for the reacceleration manipulation is larger than the control duty ratio calculated in the reacceleration operation by using the same feedback gains as those in the initial acceleration operation. As a result, in the reacceleration operation, the rotation speed of the motor 22 is quickly increased to reach the target rotation speed.

Even if the trigger switch 46 is a switch that is switched over two values of on and off, the target rotation speed may be gradually increased until the ultimate target rotation speed is reached, as shown in FIG. 12.

[Other Embodiments]

In the above embodiments, the target duty ratio of the PWM signal which controls electric power to be supplied to the motor 22 is set depending on the pulling amount of the trigger switch 46 as the manipulation unit, to vary the rotation speed of the motor 22. In contrast, a manipulation switch which is switched over two values of on and off may be adopted as the manipulation unit. When the manipulation switch is turned off, the duty ratio may be set to 0% to stop the motor 22. When the manipulation switch is turned on, a fixed target duty ratio may be set.

In this case as well, in the initial acceleration operation and the reacceleration operation, when the manipulation switch in an off state is turned on, the control duty ratio is increased in accordance with the elapsed time, so as to achieve the target duty ratio.

Also, in the above embodiments, the electric power tool 10 is described in which the motor 22 rotates only in one direction. In contrast, in an electric power tool which permits both a forward rotation and a reverse rotation, control of electric power by the control duty ratio of the present invention may be applied to the reacceleration operation in the reverse rotation.

Also, in the above embodiments, the rotation speed of the motor 22 calculated by the controller 100 is rotation frequency of the motor 22 per unit time. The rotation speed of the motor 22 calculated by the controller 100 may be the rotation angle of the motor 22 per unit time (e.g., one second).

The above embodiments provide examples in which the electric power tool of the present invention is applied to a grass mower. These are only examples. The present invention can be applied to any types of electric power tools which are operated by motors as drive sources, such as a hedge trimmer and a driver.

In the above embodiments, the functions of the duty ratio calculation unit and the parameter setting unit of the present invention are achieved by the CPU 102 of which function is specified by a control program. In contrast, at least part of the functions of the duty ratio calculation unit and the parameter setting unit may be achieved by a hardware of which function is specified by circuit configuration itself.

As noted above, the present invention is not limited to the above described embodiments, and may be applied to various embodiments without departing from the gist of the present invention.

What is claimed is:

1. A duty ratio control device that controls a control duty ratio that determines a magnitude of voltage to be applied to a motor mounted on an electric power tool, the duty ratio control device comprising:
    a duty ratio calculation unit that, when an acceleration manipulation for accelerating a rotation speed of the motor is performed, calculates the control duty ratio per predetermined timing based on a value of at least one parameter so that the rotation speed of the motor reaches a target rotation speed corresponding to the acceleration manipulation, wherein the control duty ratio is calculated to be larger as the value of the at least one parameter is larger; and
    a parameter setting unit that sets the value of the at least one parameter, wherein the value of the at least one parameter set for a reacceleration manipulation is larger than the value of the at least one parameter set for an initial acceleration manipulation, the reacceleration manipulation being the acceleration manipulation performed again during a deceleration period in which the motor is being decelerated by a stopping manipulation that stops rotation of the motor, and the initial acceleration manipulation being the acceleration manipulation performed when the rotation of the motor is being stopped.

2. An electric power tool comprising:
    a motor that receives electric power to rotate;
    a manipulation unit that is provided for a user of the electric power tool to perform an acceleration manipulation for increasing a rotation speed of the motor and a stopping manipulation for stopping rotation of the motor;
    a duty ratio calculation unit that, when the acceleration manipulation is performed, calculates a control duty ratio which determines a magnitude of voltage to be applied to the motor per predetermined timing, based on a value of at least one parameter, so that rotation speed of the motor reaches a target rotation speed corresponding to the acceleration manipulation, wherein the control duty ratio is calculated to be larger, as the value of the at least one parameter is larger;
    a parameter setting unit that sets the value of the at least one parameter, wherein the value of the at least one parameter set for a reacceleration manipulation is larger than the value of the at least one parameter set for an initial acceleration manipulation, the reacceleration manipulation being the acceleration manipulation performed again during a deceleration period in which the motor is being decelerated by the stopping manipulation, and the initial acceleration manipulation being the acceleration manipulation performed when the rotation of the motor is being stopped; and
    a drive unit that applies to the motor the voltage determined by the control duty ratio calculated by the duty ratio calculation unit to rotationally drive the motor.

3. The electric power tool according to claim 2, further comprising:
    a battery pack that supplies electric power to the motor, wherein
    the parameter setting unit sets the value of the at least one parameter set for the reacceleration manipulation larger than the value of the at least one parameter set for the initial acceleration manipulation, based on at least one of the rotation speed of the motor upon starting the reacceleration manipulation, a motor current flowing to the motor in the reacceleration manipulation, an angle acceleration of the motor during the deceleration period before the reacceleration manipulation is started, an amount of reduction in the rotation speed of the motor during at least part of the deceleration period before the reacceleration manipulation is started, and a remaining amount of power in the battery pack.

4. The electric power tool according to claim 3, wherein the parameter setting unit sets the value of the at least one parameter set for the reacceleration manipulation larger, as the rotation speed of the motor when the reacceleration manipulation is started is faster.

5. The electric power tool according to claim 3, wherein the parameter setting unit sets the value of the at least one parameter set for the reacceleration manipulation larger, as the motor current flowing to the motor in the reacceleration manipulation is larger.

6. The electric power tool according to claim 3, wherein the parameter setting unit sets the value of the at least one parameter set for the reacceleration manipulation larger, as an absolute value of the angle acceleration of the motor during the deceleration period before the reacceleration manipulation is started is larger.

7. The electric power tool according to claim 3, wherein the parameter setting unit sets the value of the at least one parameter set for the reacceleration manipulation larger, as the amount of reduction in the rotation speed of the motor during the at least part of the deceleration period before the reacceleration manipulation is started is larger.

8. The electric power tool according to claim 3, wherein the parameter setting unit sets the value of the at least one parameter set for the reacceleration manipulation larger, as the remaining amount of power in the battery pack is smaller.

9. The electric power tool according to claim 2, wherein the duty ratio calculation unit calculates the control duty ratio by a linear expression using elapsed time from when each of the initial acceleration manipulation and the reacceleration manipulation is performed as a variable, and
    the at least one parameter includes at least one of a coefficient and an intercept of the linear expression.

10. The electric power tool according to claim 2, wherein the duty ratio calculation unit calculates the control duty ratio by a predetermined feedback control law based on a difference between the target rotation speed of the motor corresponding to one of the initial acceleration manipulation and the reacceleration manipulation and an actual rotation speed of the motor, and
    the at least one parameter includes at least one feedback gain in the feedback control law.

11. The electric power tool according to claim 10, wherein
the feedback control law includes at least a proportional term, and
the at least one parameter includes a proportional gain of the proportional term.

12. The electric power tool according to claim 11, wherein
the feedback control law further includes an integral term, and
the at least one parameter further includes an integral gain of the integral term.

13. The electric power tool according to claim 2, wherein
the parameter setting unit sets the value of the at least one parameter such that the angle acceleration of the motor in the reacceleration manipulation is equal to or smaller than a predetermined maximum angle acceleration of the motor in the initial acceleration manipulation.

14. The electric power tool according to claim 2, wherein
the electric power tool is a mower that mows grass by a mowing blade driven by the motor.

15. A non-transitory recording medium readable on a computer mounted on an electric power tool including a motor, wherein the recording medium recording a program that makes the computer execute:

a duty ratio calculation step in which, when an acceleration manipulation for increasing a rotation speed of the motor is performed, a control duty ratio which determines a magnitude of voltage applied to the motor is calculated per predetermined timing based on a value of at least one parameter so that the rotation speed of the motor reaches a target rotation speed corresponding to the acceleration manipulation, and the control duty ratio is calculated to be larger, as the value of the at least one parameter is larger; and a parameter setting step in which the value of the at least one parameter is set, and the value of the at least one parameter set for a reacceleration manipulation is larger than the value of the at least one parameter set for an initial acceleration manipulation, the reacceleration manipulation being the acceleration manipulation performed again during a deceleration period in which the motor is being decelerated by a stopping manipulation that stops rotation of the motor, and the initial acceleration manipulation being the acceleration manipulation performed when the rotation of the motor is being stopped.

* * * * *